United States Patent [15] 3,661,512
Oushiba [45] May 9, 1972

[54] PREPARATION OF CHLORINE AND ALKALI METAL NITRATE AS A SIDE REACTION IN THE PRODUCTION OF NITRIC ACID

[72] Inventor: Takashi Oushiba, Tokyo, Japan
[73] Assignee: Showa Denko Kabushiki Kaisha, Tokyo, Japan
[22] Filed: Apr. 23, 1969
[21] Appl. No.: 819,514

[30] Foreign Application Priority Data

Apr. 26, 1968 Japan.................................43/27696

[52] U.S. Cl.................................................23/102, 23/161
[51] Int. Cl.......................................C01d 9/04, C01b 21/44
[58] Field of Search ...........................23/158, 160, 102, 219

[56] References Cited

UNITED STATES PATENTS

| | | | |
|---|---|---|---|
| 1,503,259 | 7/1924 | Bergue | 23/160 |
| 1,948,968 | 2/1934 | Kramer et al. | 23/157 |
| 3,211,525 | 10/1965 | Smith et al. | 23/158 X |
| 3,214,240 | 10/1965 | Beekhuis | 23/157 X |
| 3,440,011 | 4/1967 | Varlaeten et al. | 23/219 |

*Primary Examiner*—Oscar R. Vertiz
*Assistant Examiner*—G. O. Peters
*Attorney*—George B. Oujevolk

[57] ABSTRACT

A method for producing chlorine and alkali metal nitrate which comprises reacting nitrogen peroxide, water and oxygen in the presence of an aqueous nitric acid containing a nitrate of a group Ia metal having an atomic weight at least as heavy as potassium and reacting a chloride of alkali metal with the resulting solution.

8 Claims, 2 Drawing Figures

PREPARATION OF CHLORINE AND ALKALI METAL NITRATE AS A SIDE REACTION IN THE PRODUCTION OF NITRIC ACID

This invention relates to new and useful improvements in preparing nitric acid containing dissolved potassium nitrate and particularly strong nitric acid solution. The resultant strong nitric acid may be removed as the product, fractionated up to 100 percent nitric acid or utilized in a process for reacting chlorides of potassium to produce potassium nitrate and nitrogen dioxide, the latter being subjected to withdrawal, to fortify nitric acid in the system by means of my invention described later. Since potassium chloride is used as starting material for the production of potassium nitrate, at least a portion of the resultant potassium nitrate may be dissolved in said nitric acid during the process of preparing by means of this invention the concentrated nitric acid which is necessary for the above mentioned chloride reaction.

This invention also relates to a process wherein the starting chloride is exposed to relatively high concentrations and excess stoichiometric quantities of $HNO_3$ to maintain high concentrations of nitric acid in a reacting and a stripping zone under conditions permitting complete stripping of chlorine and nitrogen dioxide produced, although stripping of chlorine is more important as its presence tends to reverse the desired reaction that is, $3KCl + 4HNO_3 \rightarrow 3KNO_3 + NOCL + CL_2 + 2H_2O$. A further important feature of this invention is that, in place of the weak nitric acid hitherto used as a starting material for the preparation of potassium nitrate and chlorine from potassium chloride, nitrogen peroxide is used.

Throughout this specification, the term "strong nitric acid" refers to nitric acid concentrations with water wherein the acid component is greater than the normal azeotropic composition, i.e., from above about 68 up to 100 percent $HNO_3$ by weight. "Weak nitric acid" refers to any acid concentration with water below the normal azeotropic composition, i.e., below about 68% $HNO_3$ content. The concentrations for purposes of measurement unless otherwise specified, refer only to the nitric acid and water components and are not concerned with any other material, particularly not with nitrates, which may also be present in the mixture.

The term "nitrogen peroxide" refers to nitrogen dioxide or nitrogen tetroxide or a mixture of these. The term "nitrogen peroxide" refer to also the same containing nitrogen oxide and nitrogen trioxide.

As is well known, ordinary absorption of nitrogen dioxide will not produce strong nitric acid. Strong nitric acid is produced directly by the reaction of liquid $NO_2$ (as $N_2O_4$), oxygen and water under a pressure, of 50 kg/cm² in an autoclave for about 4 hours.

It is also known that chlorine may be produced by reacting nitric acid and an alkali metal chloride to form the corresponding alkali metal nitrate and a gaseous mixture of nitrosyl chloride and chlorine from which the chlorine may be recovered by separation from the nitrosyl chloride.

$$3 KCl + 4 HNO_3 = 3 KNO_3 + NOCL + CL_2 + 2 H_2O$$

or $$3 HCl + 4 HNO_3 = 3 HNO_3 + NOCl + CL_2 + 2 H_2O$$

It has been recognized that the separate recovery of the nitrogen and chlorine combined as nitrosyl chloride is an important factor in the economic use of that process for the commercial production of chlorine. Accordingly, it has been proposed to decompose the nitrosyl chloride by any one of numerous methods. Among such methods, it has been proposed to oxidize the nitrosyl chloride to nitrogen dioxide and chlorine by concentrated nitric acid, and then separate the chlorine from the nitrogen dioxide.

$$NOCl + 2HNO_3 = 3NO_2 + \tfrac{1}{2} Cl_2 + H_2O$$

The nitrogen dioxide formed is absorbed in water to form nitric acid which, by again being reacted with alkali metal chloride, serves to produce additional nitrate and chlorine.

If it is desired to use strong $HNO_3$ for the oxidation of nitrosyl chloride in the manner described above, this becomes an expensive process, as conventional commercial $HNO_3$ does not go above the normal azeotropic composition (68% $HNO_3$).

Therefore, it is an object of this invention to prepare the strong nitric acid in a practical way.

It is also an object of this invention to utilize "nitrogen peroxide" as starting material.

It is likewise an object of this invention to establish conditions whereby the reaction of KCl with $HNO_3$ to form $KNO_3$ and/ $Cl_2$ may go readily to completion so as to eliminate chloride in the early stages, as far as equipment is concerned, so that expensive corrosion-resistant equipment is not necessary in the later stages of the process.

It is an additional object of this invention to optionally produce strong $HNO_3$ within the chloride to chlorine process to be used in the basic reaction.

It is another object of this invention that the chloride be substantially completely reacted and then recovered as $Cl_2$.

It is also an object of this invention that all of the nitrogen from the used "nitrogen peroxide" ultimately be removed with oxygen used, as $KNO_3$.

In connection with the fact that the nitrates of group Ia metals having an atomic weight at least as heavy as potassium, when dissolved in an aqueous solution of $HNO_3$ shift the azeotropic point upwardly for $HNO_3$ (downwardly for $H_2O$), I discovered that a concentrated solution of $HNO_3$ higher than 68 percent may be obtained at rather lower pressure than in the old process described above by reacting "nitrogen peroxide", oxygen and nitric acid in the presence of dissolved, excess $NO_2$ and/or $N_2O_4$ and potassium nitrate having an atomic weight at least as heavy as potassium. Strong pure $HNO_3$ may be obtained from the solution obtained above by removing excess $NO_2$ and/or $N_2O_4$ by means of vaporization, by removing nitrate mentioned above in solution by distillation and by rectifying the $HNO_3-H_2O$ vapor obtained.

The concentrated solution of $HNO_3$ with or without the dissolved potassium nitrate mentioned above may react with KCl, NaCl, HCl or NOCl to produce the corresponding nitrate, nitrogen dioxide and then a part of chlorine and the formed nitrate solution of aqueous nitric acid may be recycled to produce more concentrated nitric acid by the process mentioned above.

For the proper understanding of my overall chloride to chlorine process the following reactions are necessary:

$$2NO_2 = N_2O_4 \quad (1)$$
$$N_2O_4 + H_2O + \tfrac{1}{2} O_2 = 2HNO_3 \quad (2)$$
$$KCl + 4HNO_3 = 3KNO_3 + NOCl + Cl_2 + 2H_2O \quad (3)$$
$$NOCl + 2HNO_3 = 3NO_2 + \tfrac{1}{2} Cl_2 + H_2O \quad (4)$$
$$KCl + NO_2 + \tfrac{1}{2} O_2 = KNO_3 + \tfrac{1}{2} Cl_2 \quad (5)$$

Reaction 5 is the sum of reactions 1, 2, 3 × ⅓ and 4× ⅓.

Thus, I have developed an overall process culminating in reaction 5, and have thus obtained the ultimate theoretical affectiveness obtainable in converting KCl, $NO_2$ and $O_2$ to $KNO_3$ and $Cl_2$, with the aid of nitric acid with potassium nitrate that need not be ultimately consumed. This nitric acid solution of potassium nitrate is necessary both as the solvent for making higher super azeotropic nitric acid and as the medium for introducing solid potassium chloride to the chloride reaction system in the form of a slurry with strong nitric acid solution without the evolution of harmful gases, i.e., NOCl. Therefore, this solution is only a useful medium which recycles through the whole system without being involved in any reaction.

Especially if the reactions 3 and 4 by $HNO_3$ solution containing potassium nitrate are connected with the reaction 1 and 2, the final reaction 5 takes place totally within these reaction systems. Therefore, there is an attractive advantage in that the dehydration process i.e., the evaporating or concentrating of the solution is not necessary in this system.

My invention distinctly differs from the known process i.e., S.W.P. process (U.S. Pat. No. 3,211,525, Chemical Engineering 198–200 Nov. 8 (1965)) in the fact that in the later the nitric acid has to be prepared by the known process and concentrated so that the water accompanying the reactions forming nitric acid is first introduced from the outside of the system and is then has to be eliminated from the system after the reaction consuming nitric acid. In contrast to the latter process, in my process the nitric acid necessary to the reaction 3 and 4 may be easily prepared in the system according to my aforementioned process, so that the water necessary to form nitric acid can be supplied from the system itself and recycled through the system without entering or leaving it.

My invention also distinctly differs from the known process in the fact that in my process potassium chloride may be easily introduced into the solution of potassium nitrate i.e., potassium nitrate in concentrated nitric acid of 80 percent or greater $HNO_3$ concentration at or below the ordinary temperature and the formed slurry of the chloride in the nitric acid solution can be heated to the temperature suitable to considerably promote the reaction 3 and 4 together.

I have found that it is more advantageous to react for a relatively short period of time the chlorides with the solution of the salt in nitric acid in sufficient quantities and at proper temperature to promote reaction 3 and 4 without further aid.

Thereafter, however, the liquid resultants must be treated to strip the resulting gases from the liquids. Thus the resulting liquids are introduced into a separation area where any chlorine containing gases are completely eliminated.

The strong nitric acid is formed in the process by my invention wherein "nitrogen peroxide", oxygen and water contained in weak, used nitric acid react, in the presence of said weak, used nitric acid containing $KNO_3$ and excess $NO_2$ and/or $N_2O_4$, at or above the ordinary temperature and at ordinary or greater than ordinary atmospheric pressure according to the reactions 1 and 2, to form nitric acid having a concentration of $HNO_3$ greater than the normal azeotropic composition. In these reactions, the $NO_2$ may be supplied partly from an outside source and partly from the chloride reaction zone according to the reaction 4 through a rectifier. It must be emphasized that my process does not require any nitric acid to be supplied from an outside source since my process itself contains a process for directly manufacturing strong nitric acid from "nitrogen peroxide." The strong nitric acid of 80 percent or greater $HNO_3$ concentration by my invention can be used to react with potassium according to the reactions 3 and 4 with or without the alkali metal nitrate. It is noted that the strong nitric acid, even though it contains the nitrate necessary to my process, is so strong as to considerably promote oxidation of potassium chloride to potassium nitrate and chlorine according to the reactions 3 and 4.

In practicing my invention, i.e., in the manufacture of chlorine an potassium nitrate from the corresponding chlorides, it is advantageous to divide the reaction system into two or more reactions systems because of the difference of the conditions of the individual reactions, though it is possible to force them into one reaction system.

The first reaction system is that for preparing nitric acid according to my invention described above in which in the presence of nitric acid, the concentration of which is at least 50 percent, of potassium nitrate and of liquid "nitrogen peroxide," oxygen or oxygen containing gases and water which is contained in the nitric acid react to form $HNO_3$ thus ultimately raising the concentration of $HNO_3$ of the original weak aqueous nitric acid.

The temperature of the system is in the range of from ordinary temperature to the boiling point of the liquid though I recommend the use of temperatures between 30° C. and 70° C. according to the content of "nitrogen peroxide" in the liquid and the pressure of the system. The higher the temperature of the system, the higher the rate of the reaction.

The pressure of the system is in the range of from ordinary atmospheric pressure to about 100 times atmospheric pressure though I recommend the use of pressures between ordinary atmospheric pressure and about 10 times atmospheric pressure. The higher the pressure of the reaction system, the higher the rate of the reaction. The higher the concentration of potassium nitrate and "nitrogen peroxide" in the liquid in the system, the higher the rate of the reaction to form nitric acid, but it is advantageous to use a concentration of potassium nitrate up to the half of saturation and a concentration of "nitrogen peroxide" in the range of 5 to 30 percent.

It is more advantageous to recycle unreacted $NO_2$, $O_2$, $NO$ etc. in the process of preparing nitric acid into the first raw gases or repeat the reaction in several steps in the packed tower, for example to react them effectively. In this process nitrogen oxide NO and nitrogen trioxide $N_2O_3$ formed can be oxidized both in the gaseous phase and in the nitrate-nitric acid solution. Accordingly it is fully possible to use $NO_2$ which contains some NO.

For the purpose of manufacturing strong nitric acid, one can treat the solution of potassium nitrate in concentrated nitric acid prepared in the manner hereinbefore described to first remove excess $NO_2$ from the solution, to then evaporate $HNO_3$—$H_2O$ vapor from the solution to separate the potassium nitrate and finally to rectify $HNO_3$—$H_2O$ vapor to obtain 99% $HNO_3$.

For the purpose of preparing chlorine, potassium nitrate and $NO_2$ from alkali metal chloride using $HNO_3$ containing $H_2O$, one need not treat the aforementioned nitrate-nitric acid solution to separate 99% $HNO_3$, but may utilize the former solution directly for the reaction with the chloride.

The second reaction system is thus, that of reacting potassium chloride, with $HNO_3$. In this system, nitric acid used may be either clean and salt free or it may contain nitrate. It is preferable to remove free $NO_2$ and/or $N_2O_4$ from these $HNO_3$ aqueous solutions because these components react easily with the chloride even at low temperature to form harmful gases, i.e., NOCl and potassium nitrate and thus make it difficult to introduce the chloride into the system.

In this reaction system the reactions 3 and 4 proceed in one or more reaction units. It is preferable to make the chlorine stripping unit a part of this reaction system in order to completely remove all chloride in processing the solution from this point on so as to eliminate the problem of corrosion that is normally encountered in the admixture of the chlorides with $HNO_3$.

The higher the temperature of this second system, the faster the rate of the reactions 3 and 4. The pressure of the system need not be much higher than atmospheric pressure.

The rates of the reactions 3 and 4 are considerably high if the final concentration of $HNO_3$ is more than 70 percent and the temperature of the reaction is as high as about 100° C.

From the second reaction system, the liquid products are cooled to crystallize potassium nitrate and separate it by an appropriate way from the motor liquor which contains potassium nitrate in aqueous nitric acid. This mother liquor is recycled to the first reaction system for manufacturing $HNO_3$.

The gaseous reaction products from the second reactor composed of $Cl_2$, $NO_2Cl$, NOCl, NO, $NO_2$ and $HNO_3$ are cooled to reflux some of the $N_2O_4$ and the greater part of the $HNO_3$ at materially 100 percent concentration. This $HNO_3$ has the ability of oxidizing more NOCl. The remaining gases are carried to the following separation system.

The third system is for separation of pure $Cl_2$ and pure $N_2O_4$.

These gaseous mixtures are rectified by the known methods. Liquid chlorine is one of the main products by the process by my discovery. On the other hand the liquid $N_2O_4$ can be used as the source material for the first reaction system for $HNO_3$ by my process.

In practicing this process nitryl chloride forms and builds up in the recycle gas stream of the total reaction systems to a steady-state value that is limited by thermodynamic equilibria.

Consequently the merits of this invention are as follows:

At first, strong nitric acid of concentration as high as 70 to 100 percent $HNO_3$ is directly manufactured from "nitrogen peroxide", oxygen or oxygen containing gases and $H_2O$ at considerably lower temperature and lower pressure in my process than ordinary methods.

Secondly, in manufacturing chlorine and potassium nitrate from the corresponding chloride, "nitrogen peroxide" and oxygen in my process, there forms no $H_2O$, whereas water always forms in ordinary processes, and therefore my process necessitates neither dehydration nor concentration.

Thirdly, as nitric acid is not the source material for this process, preliminary production of dilute nitric acid is not necessary. The only source materials for my process are the "nitrogen peroxide" prepared by oxidation of NO which is prepared from the oxidation of $NH_3$.

Therefore the total process for my invention is exceedingly simple compared with any one other processes hitherto carried out.

With the above objects and features in view, the nature of which will be more apparent, the invention will be more fully understood by reference to the drawings, the accompanying detailed description with examples and the appended claims. In the drawing:

Figure 1:
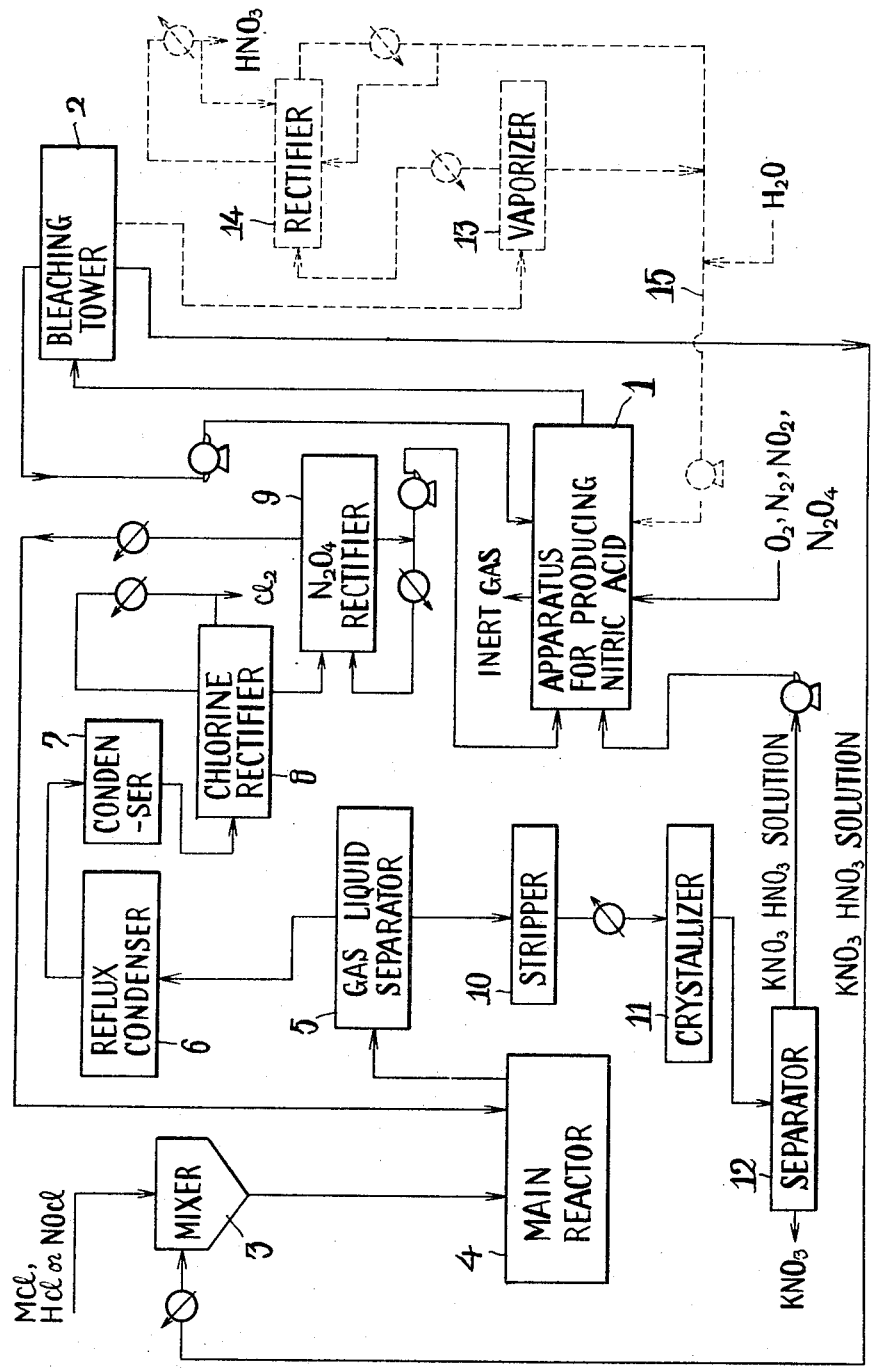
FIG. 1 is a flow-sheet illustrating an embodiment for effecting the reaction of the aqueous nitric acid containing potassium nitrate which is produced according to the method of this invention.

Referring to the drawings, especially to FIG. 1, 1 is an apparatus for producing nitric acid into which aqueous nitric acid containing potassium nitrate and nitrogen peroxide has been introduced. A mixture of pure oxygen and gaseous $NO_2$ is introduced into said apparatus 1 in the form of fine bubbles while said aqueous nitric acid is stirred, and the mixture is reacted with said solution.

The aqueous nitric acid so obtained is heated at 80° C. In bleaching tower 2 to evaporate nitrogen tetroxide. The nitrogen tetroxide evaporated is recycled to apparatus 1 for producing nitric acid. The aqueous nitric acid containing potassium nitrate remaining in the bleaching tower 2 is carried to mixer 3 to mix with potassium chloride chloride. The mixture thus obtained is introduced into main reactor 4 which is maintained at normal atmospheric pressure at about 90° C. to 140° C. Gases generated in main reactor 4 such as NOCl, $NO_2$, $NO_2Cl$, $Cl_2$, $N_2O_3$, $HNO_3$, $H_2O$, etc. according to the raw materials used, are sent together with the liquid produced in the reaction to gas-liquid separator 5 connected at its top to reflux condenser 6 which is maintained at 5° C. to 10° C. Of the gases mixed with the liquid, the total amount of the $HNO_3$ and the $H_2O$ and a part of the $NO_2$ are condensed by the means of reflux condenser 6 and flow back to gas-liquid separator 5.

The gases which have passed through reflux condenser 6 are, after being cooled to $-10°$ C. to $-5°$ C. in cooler 7, carried to chlorine rectifier 8, and 99.5 percent of liquid chlorine is obtained at the top of said rectifier 8.

The remaining solution in chlorine rectifier 8 is introduced into $N_2O_4$ rectifier 9. The volatiles constituents more volatile than $N_2O_4$ are taken from the top of said rectifier 9 and recycled to main reactor 4. Further, the 99.5 percent $N_2O_4$ solution obtained from the bottom of $N_2O_4$ rectifier 9 is returned to apparatus 1.

The aqueous nitric acid containing potassium nitrate obtained by gas liquid separator 5 is carried to separator 10 to vaporize a small amount of chlorides, the vapor being recycled to gas-liquid separator 5. The remaining solution is cooled to about 20° C. in crystallizer 11 wherein the potassium nitrate precipitates as crystal. The crystal obtained is sent to separator 12, and the residue is recycled to apparatus 1.

Furthermore, when a reaction system for producing strong nitric acid as shown in dotted lines is provided in addition to the reaction system described above, strong nitric acid, chlorine, and nitrate can be instantaneously produced with one reaction system.

Figure 2:
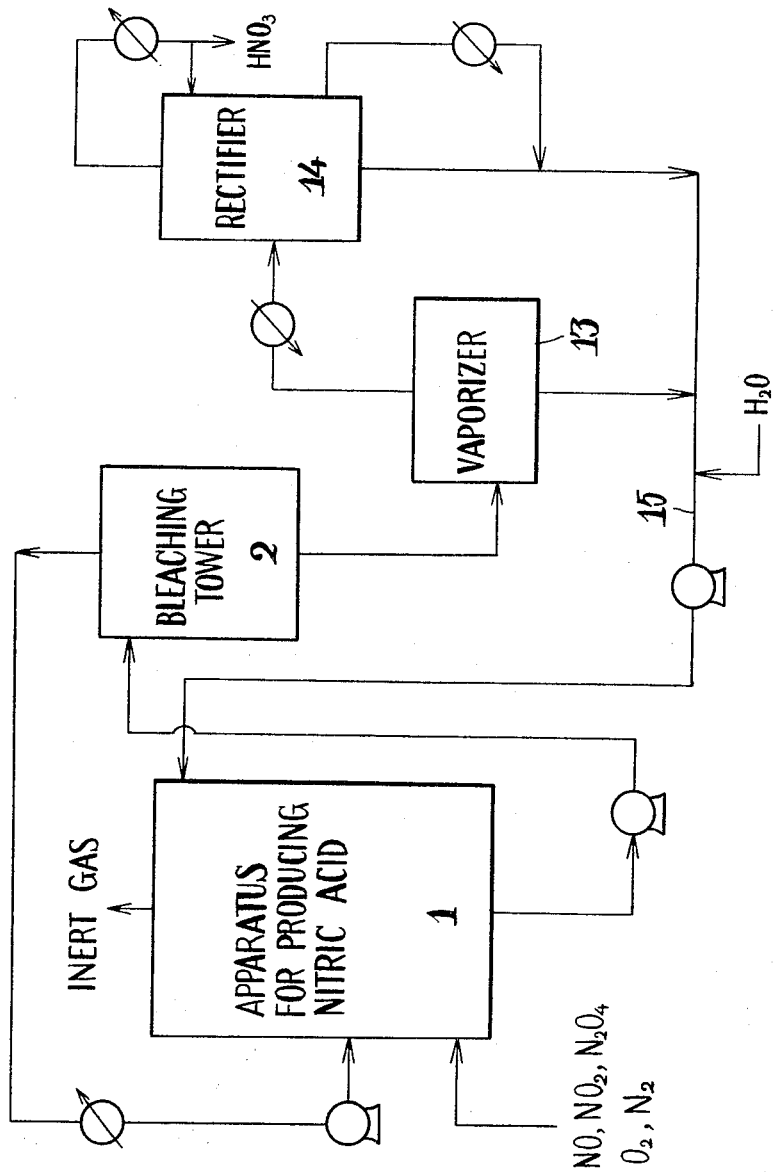
FIG. 2 is a flow-sheet illustrating an embodiment for producing nitric acid according to the method of this invention.

Referring to FIG. 2, NO, $NO_2$, $N_2O_4$ and $O_2$ are introduced into apparatus 1 for producing nitric acid as raw materials in the same way as in FIG. 1. The aqueous nitric acid obtained is heated in bleaching tower 2 to vaporize nitrogen tetroxide, and the vaporized nitrogen tetroxide is recycled to apparatus 1 for producing nitric acid. The remaining aqueous nitric acid containing potassium nitrate in bleaching tower 2 is introduced into evaporator 13 to generate nitric acid vapors from the aqueous nitric acid, and said vapors are introduced into rectifier 14 after being cooled, to obtain a strong nitric acid of high purity. The remaining aqueous nitric acid in rectifier 14 and evaporator 13 is recycled to apparatus 1 for producing nitric acid through line 15 while supplying water.

As mentioned above, the process by which this invention is carried out is very simple and more economical than that of the conventional arts.

The following examples are further illustrative of this invention, and it will be understood that the invention is not limited thereto.

EXAMPLE 1

Aqueous nitric acid ($HNO_3$ : $KNO_3$ : $H_2O$ = 56 : 21 : 23) prepared by resolving potassium nitrate and liquid nitrogen tetroxide corresponding to 25 percent of said solution by weight were previously introduced into apparatus 1 for producing nitric acid in the flow-sheet as shown in FIG. 1. Then, a mixed gas of 1.4 $m^3$ of pure oxygen and 5.5 kg of gaseous $NO_2$ per hour respectively was introduced into said apparatus at the pressure of 3 $kg/cm^2$ at 50° C. so as to form fine bubbles while said solution and liquid were being stirred.

The mixed solution containing 221 kg per hour of aqueous nitric acid ($HNO_3$ : $KNO_5$ : $H_2O$ = 68 : 15 : 17) and liquid nitrogen tetroxide corresponding to 20% parts to 100 parts of the aqueous nitric acid by weight was introduced into bleaching tower 2 from said apparatus 1 and then heated to 80° C. Nitrogen tetroxide thus evaporated was recycled to said apparatus 1. The remaining aqueous nitric acid was introduced into mixer 3 to mix it with potassium chloride supplied at 9 kg per hour, and then carried to main reactor 4 which was maintained at normal atmospheric pressure at 100° C. The gases generated by the reaction in reactor 4 were refluxed and condensed, then cooled and carried to the chlorine rectifier. Thus, 4.2 kg per hour of 99.5 percent liquid chlorine was obtained in the chlorine rectifier 8. The nitric acid containing nitrate separated by gas-liquid separator 5 was cooled to 20° C. in crystallizer 11. Thus, 12 kg per hour of potassium nitrate (purity 99.0 percent) was obtained.

EXAMPLE 2

A mixed gas containing 11 kg of NO, 57 kg of $NO_2$ and $N_2O_4$, 10 kg of $H_2O$, 16 $m^3$ of oxygen and 80 $m^3$ of nitrogen per hour respectively was introduced into apparatus 1 as shown in FIG. 2 at the pressure of 10 $kg/cm^2$ at 30° C. A solution of potassium nitrate in aqueous nitric acid recycled from the following process into the top of the tower and was allowed to flow down in counter current to the said mixed gases. The solution withdrawn from the bottom of the apparatus 1 was introduced into a beaching tower 2 to remove nitrogen tetroxide which was recycled to the apparatus 1 and the remaining nitric acid solution of potassium nitrate was next subjected to vaporization to separate the mixed vapors of $HNO_3$ and $H_2O$ at vaporizer 13. The nitric acid vapor was then carried to a rectifier 14 and 100 kg per hour of 99.9 percent pure $HNO_3$ was obtained from the top of said rectifier 14 and 68 percent pure $HNO_3$ aqueous solution was obtained at the bottom of said rectifier 14. Both the remaining solution at the vaporizer 13 and the residue at the rectifier 14 were recycled to the apparatus 1 through line 15 while supplying 6 kg per hour of water.

By this reaction the concentration of aqueous nitric acid raised to 87.6 percent that is 30 kg of $HNO_3$ was formed.

I claim:

1. A method of producing chlorine and potassium nitrate comprising the steps of:
   1. reacting excess nitrogen peroxide and oxygen with nitric acid containing at least 50 percent by weight of potassium nitrate to form a higher super azeotropic nitric acid,
   2. reacting at least a portion of said super azeotropic nitric acid containing potassium nitrate with potassium chloride to form additional potassium nitrate and gas containing chlorine and nitrogen peroxide,
   3. separating said gas from said nitric acid solution containing potassium nitrate, and
   4. separating said gas into chlorine and nitrogen perioxide and recycling said nitrogen peroxide to step 1.
2. The process of claim 1 wherein a portion of said potassium nitrate is separated from said nitric acid solution produced in step 2 and the nitric acid solution is recycled to step 1.
3. The process of claim 1 wherein said step 1 is conducted at a temperature between room temperature and the boiling point of the mixture.
4. The process of claim 1 wherein said step 1 is conducted at a temperature between 30° and 70° C.
5. The process of claim 1 wherein said step 1 is conducted at a pressure of from atmospheric to 100 atmospheres.
6. The process of claim 1 wherein said step 1 is conducted at a pressure of from atmospheric to 10 atmospheres.
7. The process of claim 1 wherein said super azeotropic nitric acid contains at least 70 percent by weight of nitric acid.
8. The process of claim 1 wherein said step 2 is conducted at a temperature between room temperature and about 100° C.

* * * * *